United States Patent [19]

Aoyama et al.

[11] Patent Number: 5,008,070

[45] Date of Patent: Apr. 16, 1991

[54] FUEL ASSEMBLY

[75] Inventors: Motoo Aoyama, Mito; Junichi Koyama, Hitachi; Sadao Uchikawa, Katsuta; Yasunori Bessho, Mito; Michihiro Ozawa, Hitachi; Mitsunari Nakamura, Hitachi; Akinobu Nakajima, Hitachi; Hiromi Maruyama, Katsuta, all of Japan

[73] Assignee: Hitachi, Ltd., Tokyo, Japan

[21] Appl. No.: 268,595

[22] Filed: Nov. 7, 1988

[30] Foreign Application Priority Data

Nov. 7, 1987 [JP] Japan ................ 62-281639
Jun. 24, 1988 [JP] Japan ................ 63-154746

[51] Int. Cl.$^5$ .................... G21C 3/00
[52] U.S. Cl. .................... 376/419; 376/428; 376/444
[58] Field of Search .......... 376/419, 428, 444

[56] References Cited

U.S. PATENT DOCUMENTS

| | | | |
|---|---|---|---|
| 4,280,874 | 7/1981 | Kawai et al. | 176/78 |
| 4,324,615 | 4/1982 | Kobayashi et al. | 376/267 |
| 4,652,427 | 3/1987 | Uchikawa et al. | 376/447 |
| 4,683,113 | 7/1987 | Mochida et al. | 376/419 |
| 4,832,906 | 5/1989 | Aoyama et al. | 376/419 |

Primary Examiner—Lechert, Jr. Stephen J.
Assistant Examiner—Nina Bhat
Attorney, Agent, or Firm—Antonelli, Terry, Stout & Kraus

[57] ABSTRACT

A fuel assembly has a plurality of first fuel rods each of which contains nuclear fuel material but does not contain burnable poison, and a plurality of second fuel rods each of which includes nuclear fuel material and burnable poison. The amount of burnable poison in a lower region of the fuel assembly is smaller than that in an upper region thereof. When each of the second fuel rods is divided into an upper region and a lower region, a region of the divided regions in the second fuel rods containing a maximum burnable poison concentration Gmax and a region of the divided regions in the second fuel rods containing a minimum burnable poison concentration Gmin are located in the lower region of the fuel assembly. The burnable poison concentration of the upper region of each second fuel rod is between Gmax and Gmin. The fuel assembly may moderate a maximum linear heat rating with an increased spectral shift effect.

17 Claims, 14 Drawing Sheets

FUEL ASSEMBLY

BACKGROUND OF THE INVENTION

The present invention relates to a fuel assembly, and more particularly to a fuel assembly suitable for enhancing fuel utilization, which is to be installed in a boiling water reactor (BWR).

Under the condition that a fuel assembly to be used in the BWR is installed in a reactor core, non-saturated cooling water or coolant is flowed between fuel rods through holes of a lower tie plate of the fuel assembly. As the coolant is flowed between the fuel rods from a lower portion thereof to an upper portion thereof, the coolant is heated and boiled to form a two-phase flow to be discharged from holes of an upper tie plate. Therefore, a light water that is neutron moderator is generally distributed so that the amount thereof is decreased from the lower portion to the upper portion within the fuel assembly. Also, it should be noted that the actual distribution of the coolant in the axial direction depends upon the mutual effect with the power distribution. Namely, an average void fraction of the reactor core determined by such distribution controls the neutron moderation effect of the overall reactor core and the power distribution.

Recently, in order to realize the effective use of uranium resource and the power cost reduction thereof, it has been proposed to enhance an average enrichment of the fuel assembly to provide a fuel assembly with a high burnup. The high burnup of the fuel assembly causes a burnup reactivity to increase, which is needed for continuing the operation among the reactor during one operational cycle. In the BWR, it has been proposed to control the reactivity mainly by adjusting the amount of burnable poison, i.e., gadolinia and the reactor core average void fraction. This adjustment of the reactor core average void fraction is performed by operating the reactor with a high void fraction during the operational cycle from the initial stage to the nearly end thereof, at which the neutron moderating effect is small, whereby the controlled amount of reactivity is increased by an absorption of neutron into uranium 238. The adjustment is performed, inversely, by using a low void fraction at the operational cycle end. A method for adjusting the reactor core void fraction is called "spectral shift operation". In that method, since plutonium 239 converted from uranium 238 is effectively used as a fuel in the final stage of the operational cycle, such effective use of plutonium 239 as well as the reactivity control effect to enhance the fuel economical property. The spectral shift operation method is divided into a method for changing the flowrate of the coolant during the operational cycle and a method for changing the axial power distribution during the operational cycle.

The latter method is disclosed in U.S. Pat. No. 4,587,090. According to this method, a difference in reactivity between the upper region and the lower region of the fuel assembly due to the difference of the enrichment and a difference in reactivity between the upper region and lower region due to the difference of the burnable poison amount are effectively utilized so that the power distribution of the fuel assembly during first half of the reactor operation cycle is deformed downwardly and the power distribution of the fuel assembly during second half of the reactor operation cycle is deformed upwardly.

SUMMARY OF THE INVENTION

An object of the invention is to provide fuel assembly which is capable of increasing a spectral shift effect without increasing a maximum linear heat generation rate.

To this end, according to the present invention, a burnable poison concentration in a lower region of the fuel assembly is lower than that in an upper region thereof. When each of the fuel rods containing the burnable poison is divided into an upper region and lower region, one of the divided regions of the fuel rods containing a maximum burnable poison concentration Gmax and one of the divided regions of the fuel rods containing a minimum burnable poison concentration are located in the lower region of the fuel assembly.

DETAILED DESCRIPTION OF THE PREFERRED EMBODIMENTS

The inventors have studied the fuel assembly shown in U.S. Pat. No. 4,587,090, i.e., the fuel assembly in which not only an enrichment but also an amount of a burnable poison in the upper region is larger than that in the lower region, and then found that the conventional fuel assembly suffers from the following new problems. Namely, the conventional fuel assembly suffers from a problem such that, in the case where it is desired to increase the spectral shift effect, as the burnable poison in the lower region of the fuel assembly is decreased, a maximum linear heat rating of fuel rods is considerably increased. If the number of the fuel rods that contains the burnable poison in the lower region or the concentration of the burnable poison contained in the fuel rods would be reduced, a neutron infinite multiplication factor would be increased in the lower region, so that the reactivity difference between the upper and lower portions of the reactor core becomes large. In addition, the thermal neutron flux density would be increased in the lower region of the reactor core so that the burning of the burnable poison would be hastened to further increase the reactivity difference between the upper and lower regions. For that reason, there would be a fear that the operational limit for the maximum linear heat rating would be exceeded because of the lower region peak in the axial power distribution at a certain period during the operational cycle.

A variety of arrangements of the fuel assembly for overcoming the above-described new problems have been studies. The results of such studies will be explained hereinunder.

The inherent function of the burnable poison is to control the excess reactivity at the initial stage of the operational cycle. Since the burnable poison is a strong neutron absorption material, the material should be prevented from being unburnt at the final stage of the operational cycle. Also, in the burnable poison such as gadolinia, the undue absorption of the neutron by the nuclides after the neutron absorption is not negligible. It is, therefore, important to reduce the burnable poison within the range where the reactivity at the initial stage of the cycle can be moderated in view of the economical point of the neutron.

Figure 1A:
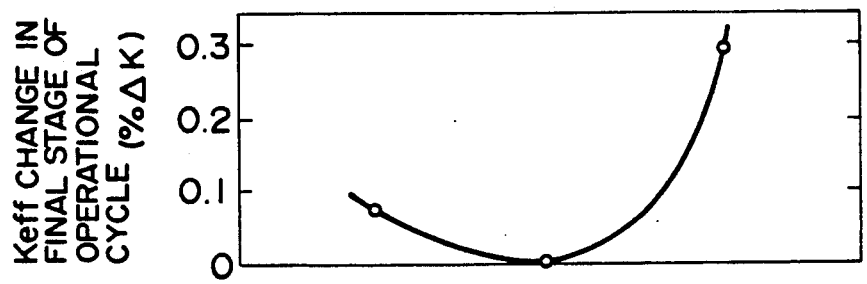
FIGS. 1A to 1D are characteristic diagrams showing relationships between a gadolinia concentration distribution and reactor characteristics.
Figure 1B:
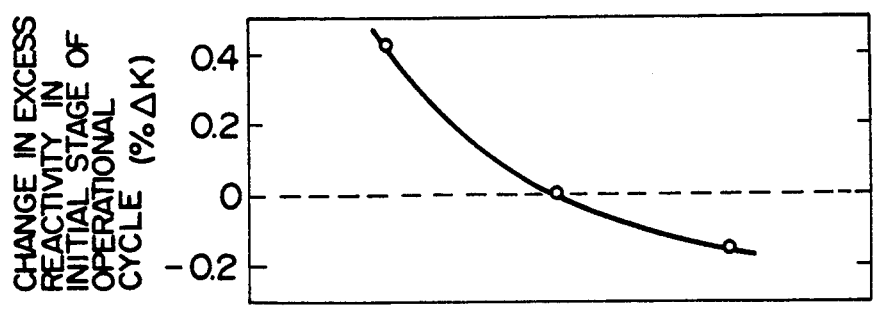
Figure 1C:
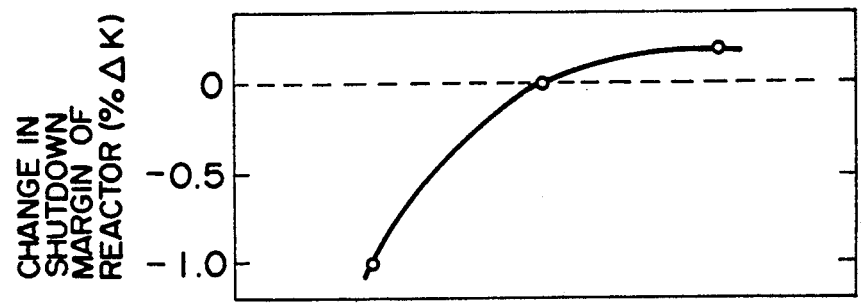

In view of the above-described point, it is very effective to reduce the amount of the burnable poison in the lower region of the fuel assembly. FIGS. 1A to 1D show the differences of operation changes, respectively, in the case (1) where the amount of gadolinia ($Gd_2O_3$), i.e., the burnable poison is decreased in the upper region of the fuel assembly, in the case (2) where the amount of gadolinia is kept constant between the upper and lower regions of the fuel assembly, and in the case (3) where the amount of gadolinia is decreased in the lower region of the fuel assembly. In the case (1) where the amount of gadolinia in the lower region is decreased, the reactivity increment in the final stage of the operational cycle is remarkable due to the spectral shift effect as described above and shown in FIG. 1A. Since the void fraction in the initial stage in the operational cycle is increased, the excess reactivity is rather suppressed to a low level irrespective of the small amount of gadolinia (FIG. 1B). Also, since the reactivity increment in the reactor core is decreased when the operation state is in the transient stage from the operation state to the cold condition, the shutdown margin of the reactor is increased as shown in FIG. 1C.

Figure 1D:
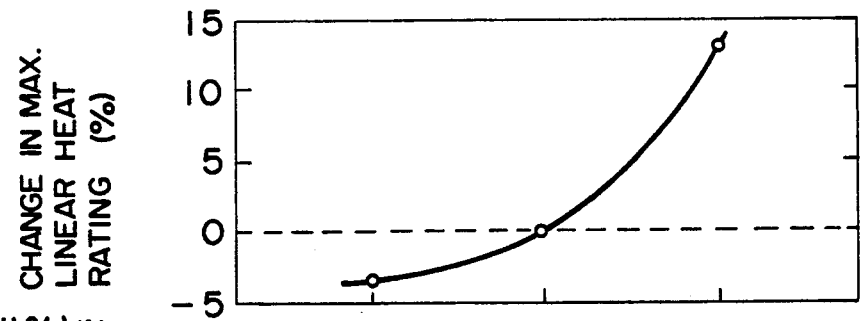

As described above, it is possible to enhance the fuel utilization without degradation of the shutdown margin of the reactor or the excess reactivity by reducing the amount of the gadolinia in the lower region of the fuel assembly. However, if the reduction of the amount of the gadolinia in the lower region of the fuel assembly is performed simply by decreasing the concentration of the gadolinia in the lower region or by decreasing the number of the fuel rods containing in the lower region thereof the gadolinia, the maximum linear heat rating is considerably increased as shown in FIG. 1D. The above-mentioned features of the present invention can be achieved on the basis of the concept to optimize the change in burning of power distribution in the reactor core axial direction power and of the burnable poison amount in the lower region of the fuel assembly in which the maximum spectral shift effect may be obtained without remarkably increasing the maximum linear heat rating.

Figure 2:
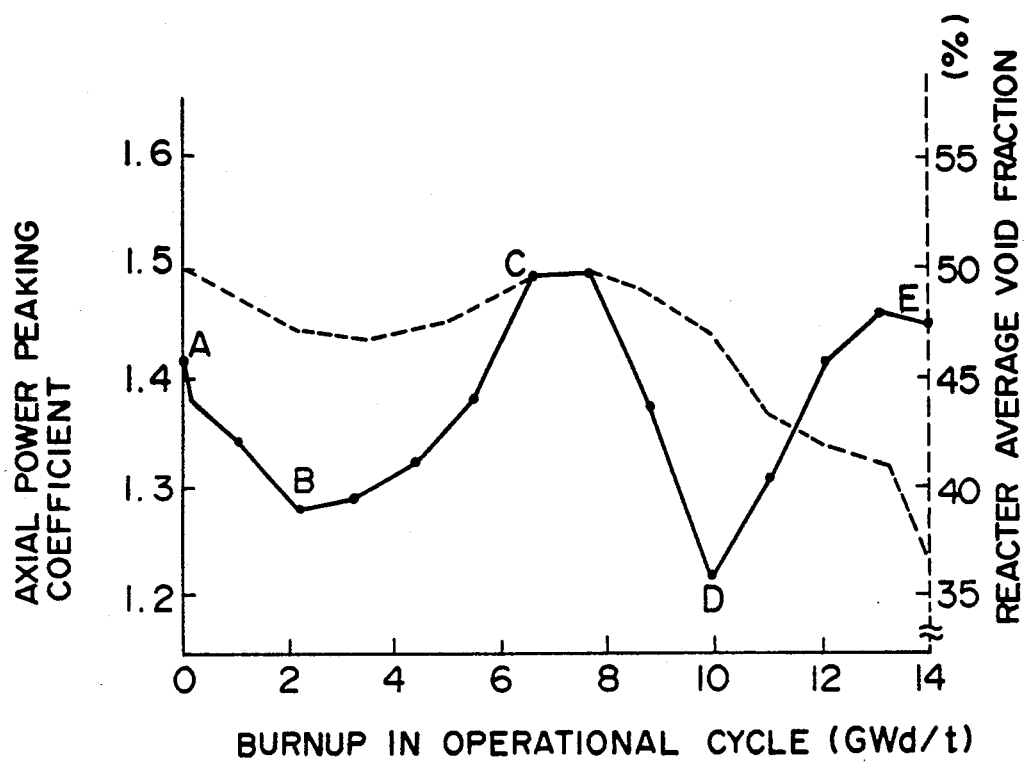
FIG. 2 is a characteristic diagram showing relationship between a burnup and an axial power peaking coefficient.
Figure 3:
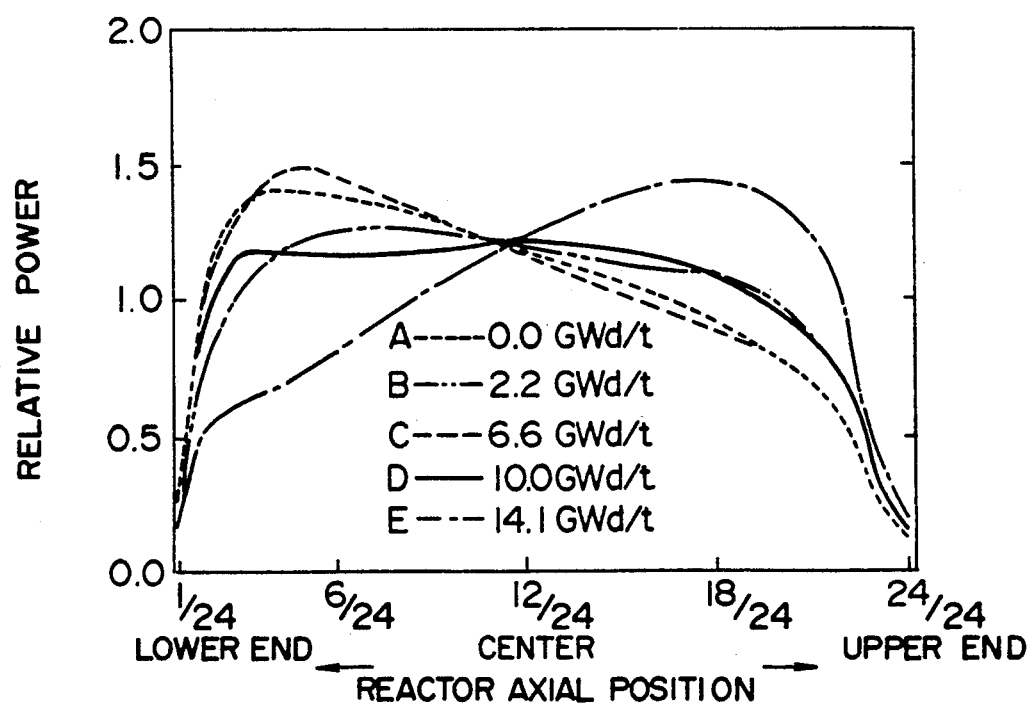
FIG. 3 is a characteristic diagram showing relative power distribution in the axial direction.
Figure 4:
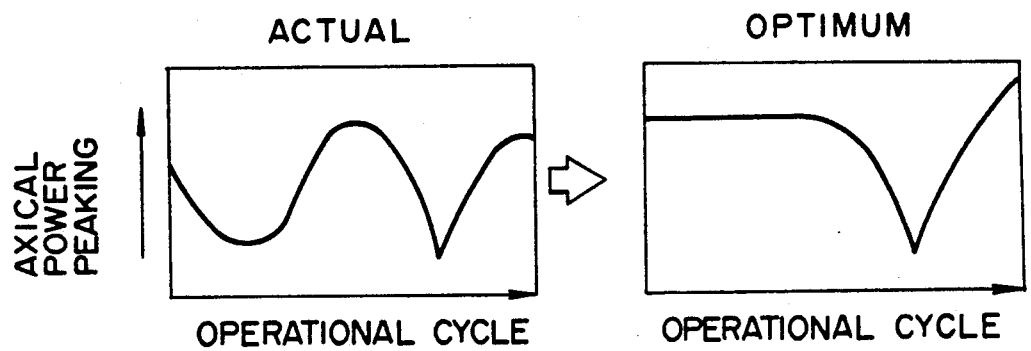
FIG. 4 is a view for illustrating the optimum axial power distribution.

FIG. 2 shows a typical burning change at the axial power peaking. FIG. 3 shows the power distribution in the axial direction of the reactor core with respect to each burnup at the points A to E shown in FIG. 2. In FIG. 2, the lower peak of the axial power distribution at the initial of the operational cycle (point A) is weakened once at the point B and again strengthened most at the point C. Thereafter, the axial power distribution is rapidly flattened and weakened, and past the point D, the upward peaked power distribution is provided. With respect to such a change, as shown in FIG. 4, the peaking of the lower region is kept at a high level before the middle of the operational cycle while the axial power peaking maximum is being kept constant (in the right side condition of FIG. 4). As a result it is possible to increase the spectral shift effect without increasing the maximum linear heat rating.

A plurality of groups of fuel assemblies that have different operational cycles are installed in the reactor core. According to the inventors' analyses, the action of the axial power peaking in the initial stage of the operational cycle mainly depends upon the burnup change in reactivity ratio between the upper region and lower region of the fuel assemblies in the first and the second operational cycles, and depends upon a relative power ratio of the fuel assemblies in the first and the second operational cycles. The local maximum peaking value of the axial output in the intermediate stage of the operational cycle depends upon the maximum value of the reactivity ratio between the upper and the lower regions of the fuel assemblies in the first operational cycle. Therefore, if the change of the neutron infinite multiplication factor in the initial burnup stage is adjusted by the amount of gadolinia of the fuel assemblies to suitably set the burnup change of the reactivity ratio of the upper and the lower regions of the first cycle fuel assemblies, a desired axial power peaking change as shown in the right portion of FIG. 4 may be obtained.

Figure 5:
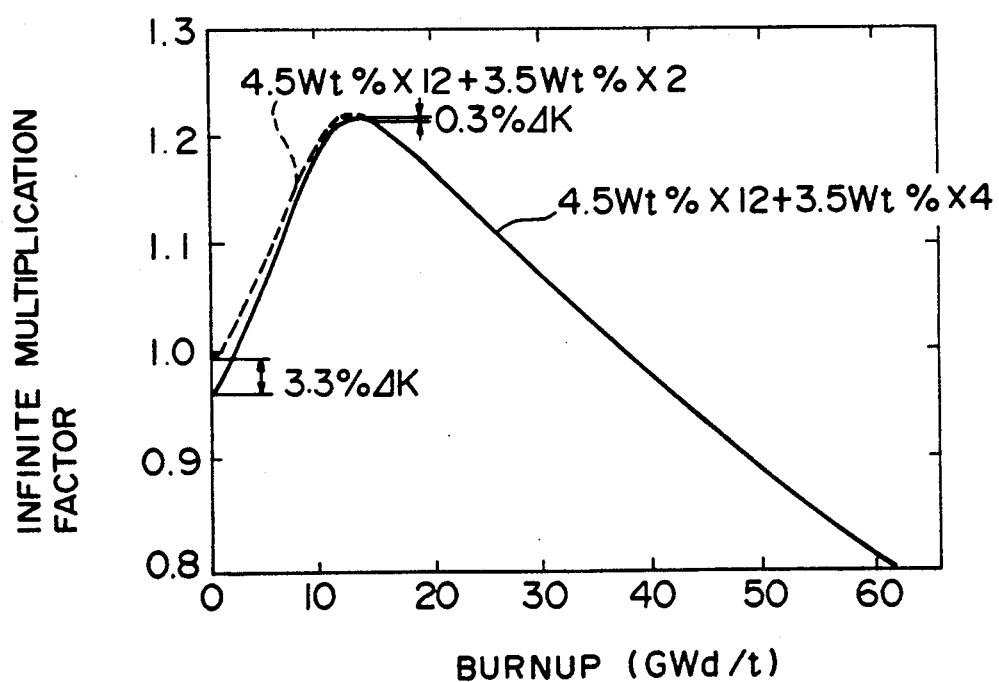
FIGS. 5 and 7 are views showing characteristics between the burnup and the initiate multiplication.
Figure 6A:
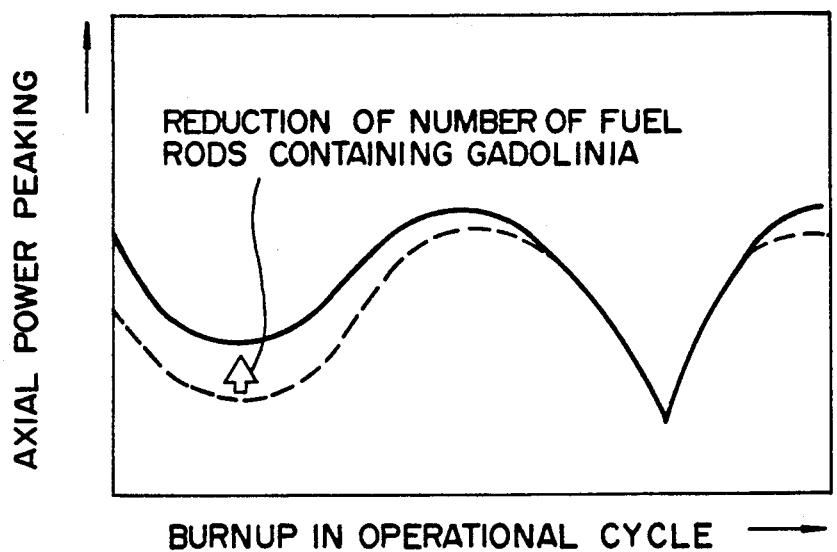
FIGS. 6A and 6B are illustrative of changes in axial power peaking by the axial gadolinia concentration.

The reactivity value of the strong neutron absorption material such as gadolinia depends upon a surface area thereof. The more the number of the fuel rods containing the gadolinia becomes, the more the reactivity moderating effect becomes. FIG. 5 shows the relationship between the number of the fuel rods containing the gadolinia and the neutron infinit multiplication factor. The neutron infinite multiplication factor of a fuel assembly composed of twelve fuel rods containing gadolinia by 4.5 wt% and four fuel rods containing gadolinia by 3.5 wt% is, in the initial state of the operational cycle, smaller by 3.3% $\Delta k$ than that of a fuel assembly in which the number of the fuel rods containing gadolinia by 3.5 wt% is less by two than that of the former case. However, at the final stage when gadolinia is burnt up, there is only difference in maximum value of the neutron initiate multiplication factor only by 0.3% $\Delta k$ because the value does not have a direct relationship with the number of the fuel rods containing the gadolinia in the case where the gadolinia concentration is kept constant in the fuel rods. When the number of the fuel rods containing the gadolinia in the lower portion of the fuel assembly is decreased, the lower region power peaking of the fuel assembly is raised, as shown in FIG. 6A, in particular at the initial stage of the operational cycle. In accordance with this phenomenon, the burnup rate difference between the upper and the lower regions of the fuel assembly is more enlarged, so that the lower region power peaking will be somewhat raised during the intermediate stage of the operational cycle.

Figure 6B:
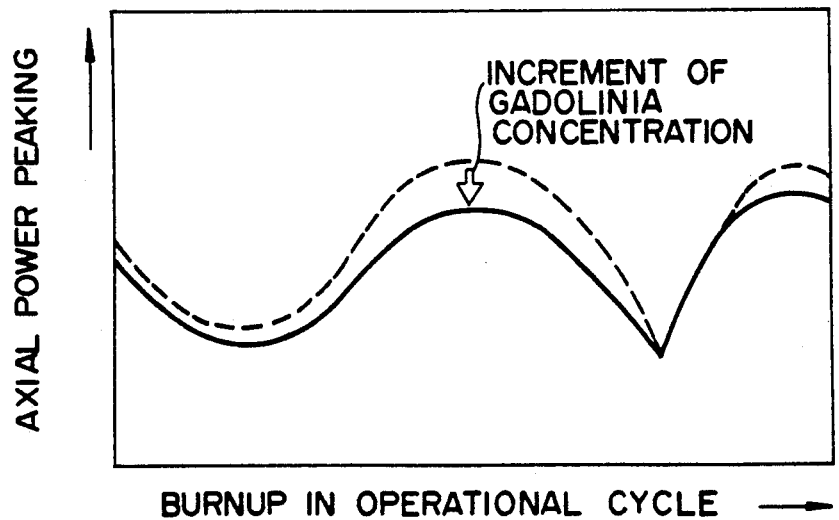
Figure 7:
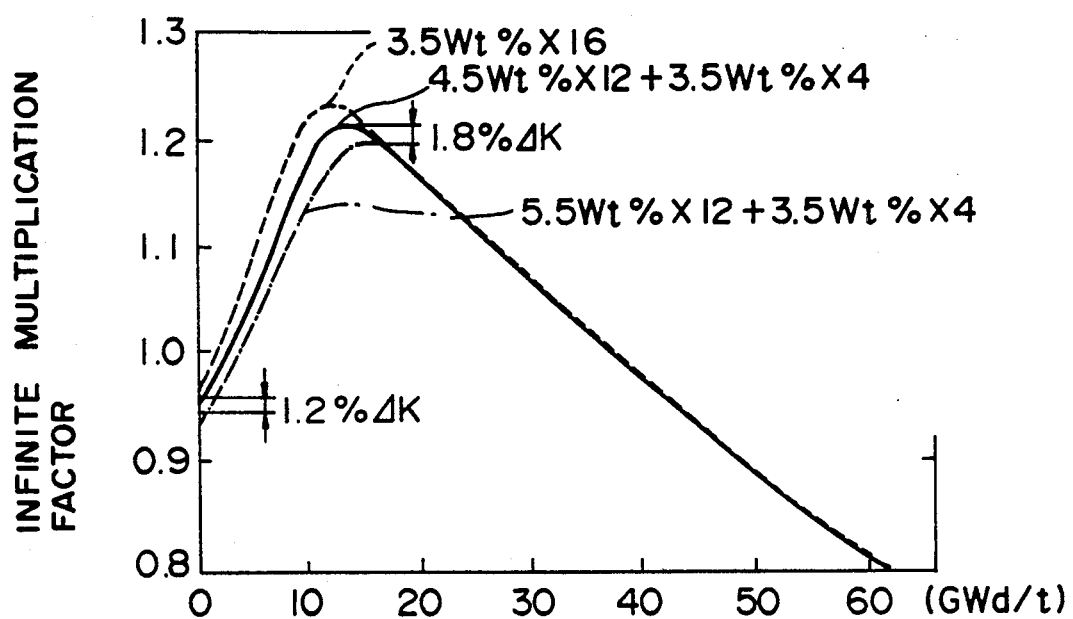

The concentration of the gadolinia contained in a single fuel rod will affect the burnup period of gadolinia. As shown in FIG. 7, the neutron infinite multiplication factor at the initial burnup stage may be kept within a short range of about 1.2% Δk according to the gadolinia concentration. However, if the concentration of gadolinia is low, the gadolinia will quickly be burnt up, so that the burnup reaching the maximum value of the infinite multiplication factor will be accelerated to provide a difference of 1.8% Δk in the maximum value of the neutron infinite multiplication factor. Therefore, the concentration of the gadolinia will affect the magnitude of the lower region peaking in particular in the intermediate stage of the operational cycle. When the concentration of gadolinia in the lower region of the fuel rod is increased, as shown in FIG. 6B, the power peaking in the lower region of the fuel assembly may be lowered mainly in the intermediate stage of the operational cycle.

The solid line in FIG. 7 indicates the characteristics of the fuel assembly composed of twelve fuel rods containing gadolinia by 4.5 wt% and four fuel rods containing gadolinia by 3.5 wt%. The dotted line indicates the characteristics of the fuel assembly composed of sixteen fuel rods containing the gadolinia by 3.5 wt%. The dot and dash line indicates the characteristics of the fuel assembly composed of twelve fuel rods containing gadolinia by 5.5 wt% and four fuel rods containing gadolinia by 3.5 wt%.

The axial power peaking control effect may be ensured by the combination of the number of the fuel rods containing the gadolinia and the gadolinia concentration to obtain the axial power peaking change close to the right portion shown in FIG. 4. Namely, the number of the fuel rods containing the gadolinia is decreased in the lower region of the fuel assembly, and the gadolinia concentration in that region is increased, so that the portion corresponding to the trough in the axial power peaking change may be raised in the initial stage in the operational cycle and the portion corresponding to the crest in the axial power peaking change may be lowered in the intermediate stage of the operational cycle. The adjustment of the gadolinia amount at which such characteristics may be obtained corresponds to the case where the gadolinia concentration which is lowest in the lower region of the fuel rods is kept at zero.

However, the above-described fuel assembly is not constructed so as to control the axial power peaking at the very initial stage of the operational cycle. Namely, since the number of the fuel rods containing the gadolinia in the lower region of the fuel assembly is reduced, the power distribution in the transverse cross-section of the fuel assembly is made uniform to reduce the local power peaking. Therefore, the increment of the linear heat rating is small relative to the increment of the power peaking in the lower region of the fuel assembly. However, as the number of the fuel rods containing the gadolinia in the lower region of the fuel assembly is decreased, the peaking of the power in the lower region in the initial stage of the operational cycle is rapidly increased. For that reason, if the number of the fuel rods containing the gadolinia in the lower region of the fuel assembly is decreased to exceed some lower limit, the linear heat rating will be at maximum in the initial stage of the operational cycle. In order to improve this, it is preferable to reduce the lowest gadolinia concentration in the lower region to a rather small level that is not zero. Namely, the gadolinia at the lowest concentration (but not zero) in the lower region of the fuel rods only functions to suppress the power in the lower region at the very initial stage of the operational cycle. Thus, it is possible to shift the change of the axial power peaking relative to the burnup further to an ideal one.

Subsequently, the fuel rods containing the gadolinia at minimum concentration in the lower region among the gadolinia containing fuel rods should be located as follows.

(i) The reactivity in the lower region of the fuel assembly should be effectively reduced in the very initial stage of the operational cycle.

(ii) Where the neutron spectrum is soft and the neutron importance is high, the amount of the burnable poison should be decreased as much as possible.

Namely, it is preferable that the concentration of gadolinia should be low in the region close to the saturated water region such as locations adjacent to the water rods. In a region where the neutron flux density is high and the spectrum is soft, the reactivity moderating effect at the initial stage of burnup is remarkable even with a small amount of gadolinia. The small amount of gadolinia will be burnt rapidly, so that it is possible to readily attain an object to moderate the reactivity at the very initial stage of the operational cycle. Also, in view of the neutron absorption by the gadolinia nuclides after the neutron has been absorbed thereby, it is possible to enhance the reactivity after the burnup of the gadolinia by decreasing the amount of the gadolinia in the region adjacent to the saturated water region.

In order to make, among the fuel assemblies, a wide region where the neutron spectrum is soft as described above, available is the fuel assembly where the water rod region is increased (that is, the number of the water rods is increased or the outer diameter of the water rods is increased).

Incidentally, with respect to the enrichment of the upper and lower regions of the fuel assembly, if the upper region enrichment is higher than the lower region enrichment as shown in U.S. Pat. No. 4,229,258, the axial power distribution is made uniform to reduce the lower region power peaking. Since such a decreased amount of the power peaking in the lower region of the fuel assembly is not substantially related to the burnup of the operational cycle, it is effective to keep the axial power peaking substantially in a uniform state over the entire period of the operational cycle without largely changing the burnup of the axial power peaking.

An embodiment which is obtained on the basis of the above mentioned inventors' study will be explained hereinunder.

Figure 8:
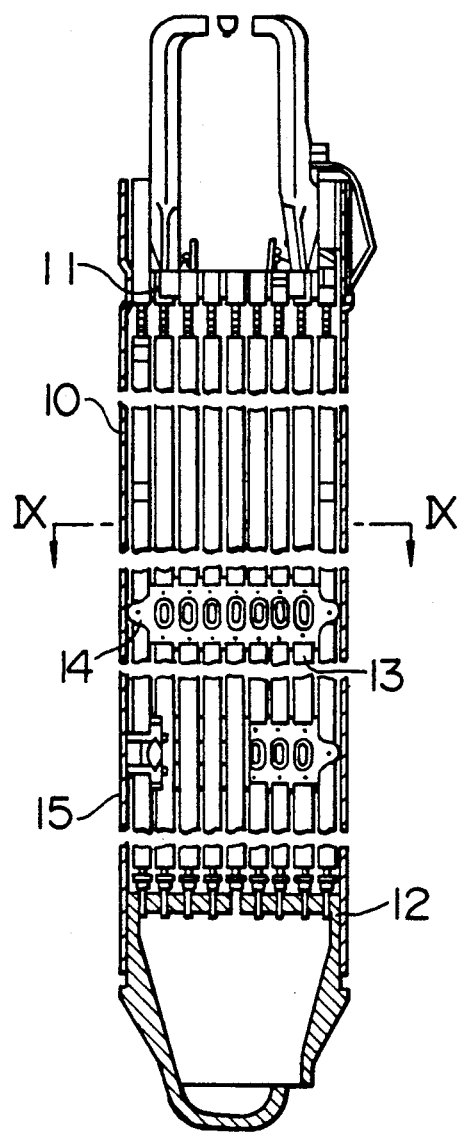
FIG. 8 is a structural view showing a fuel assembly in accordance with an embodiment of the invention.
Figure 9:
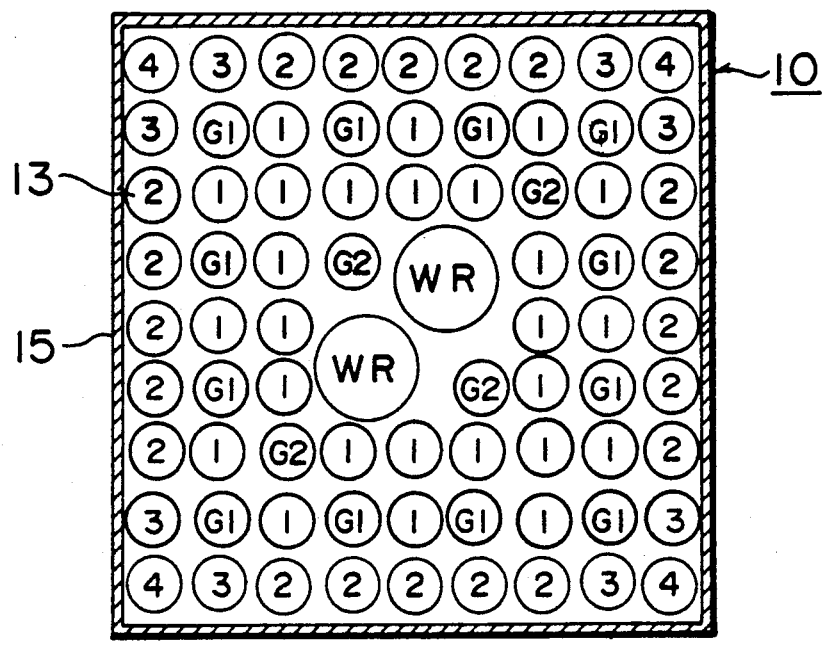
FIG. 9 is a cross-sectional view taken along the line IX—IX in FIG. 8.

The preferred embodiment of the invention applied to a boiling water reactor will now be described with reference to FIGS. 8 and 9.

A fuel assembly 10 according to the embodiment comprises an upper tie plate 11, a lower tie plate 12, a plurality of fuel rods 13, a plurality of fuel spacers 14 and two water rod WR. Each of the fuel rods 13 and the water rods WR are supported at its upper end portion to the upper tie plate 11 and at its lower end portion to the lower tie plate 12, respectively. Dioxide uranium pellets are filled in the fuel rods 13. The fuel spacers 14 are used to support the respective fuel rods 13 so that a space between the adjacent fuel rods 13 is kept at a predetermined distance. A channel box 15 is mounted on the upper tie plate 11 to surround the periphery of the fuel rod bundle supported by the fuel spacer 14.

Six kinds of fuel rods 1 to 4, G1 and G2 are used as the fuel rods 13. The fuel rods are arranged in a regular square matrix of 9 rows and 9 columns. The two water rods WR are located in the central portion of the transverse cross-section of the fuel assembly and close to each other on a straight line connecting a pair of opposite corners of the channel box 15. An outer diameter of the water rod WR is larger than a pitch of the fuel rods. The two water rods WR occupies an area corresponding to the seven fuel rods 13 arranged at the same fuel rod pitch. Namely, seven fuel rods 13 are replaced by the two water rods WR. The fuel assembly having such an arrangement is shown in FIGS. 1, 7 and 8 of Japanese Patent Unexamined Publication No. 62-217186.

Figure 10:
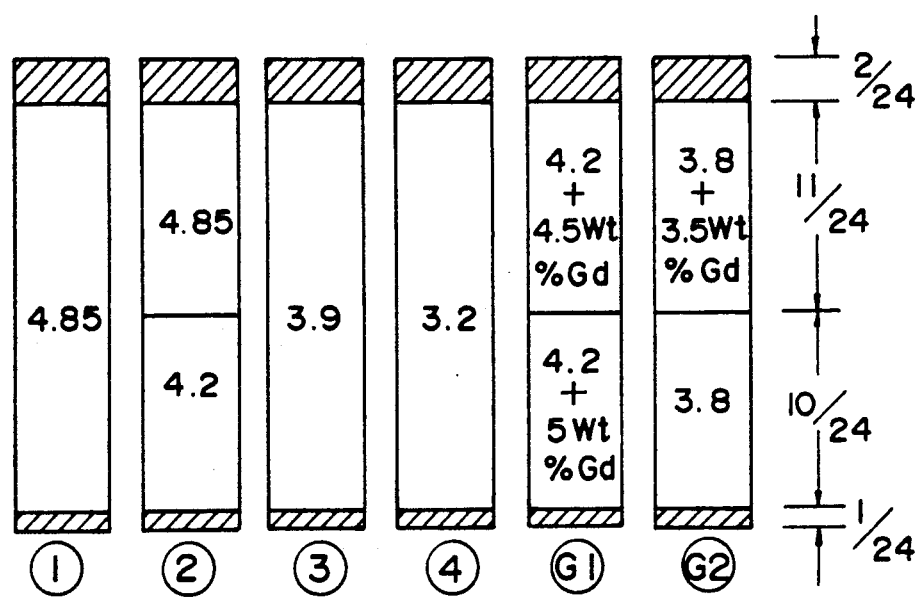
FIG. 10 is illustrative of the enrichment and the gadolinia concentration distribution of each fuel rod shown in FIG. 9.

The enrichment in the axial direction of the fuel rods 1 to 4, G1 and G2 and the gadolinia concentration distribution are shown in FIG. 10. Each fuel rod is filled with natural uranium in a range between a lower end of the effective length portion of the fuel and 1/24 of the effective length thereof, and in a range between 22/24 and 24/24 of the effective length portion with reference to the lower end of the effective length portion. The hatched regions of each fuel rod in FIG. 10 show the natural uranium filled portion. The fuel effective length portion means the region in which the fuel pellets are filled. None of the fuel rods 1 to 4 contain gadolinia. The fuel rods G1 and G2 contain gadolinia to be used as the gadolinia containing fuel rods. The average gadolinia concentration of the fuel rod G2 is lower than that of the fuel rod G1. The enriched uranium filling region of the fuel rods 1 to 4, G1 and G2 are in the range of 1/24 to 22/24 of the axial entire length of the fuel effective length portion with reference to the lower end of the fuel effective length. In the fuel rods 1, 3, 4, G1 and G2, the enrichment in the axial direction is uniformed in the enriched uranium filling region. The enrichments in the enriched uranium filling region of the fuel rods 1, 3, 4, G1 and G2 are as follows. The enrichment of the fuel rod 1 is at 4.85 %, the enrichment of the fuel rod 3 is at 3.90 %, the enrichment of the fuel rod 4 is at 3.20 wt%, the enrichment of the fuel rod G1 is at 4.20 wt% and the enrichment of the fuel rod G2 is at 3.8 wt%. The enrichment in the enriched uranium region of the fuel rod 2 is at 4.20 wt% in the range of 1/24 to 11/24 of the axial entire length of the fuel effective length portion with reference to the lower end of the fuel effective length portion, and at 4.85 % in the range of 11/24 to 22/24 of the axial entire length of the fuel effective length portion. The gadolinia concentration distributions of the fuel rods G1 and G2 are as follows. The gadolinia concentration of the fuel rod G1 is at 5.0 wt% in the range of 1/24 to 11/24 of the axial entire length of the fuel effective length portion with reference to the lower end of the fuel effective length portion, and the gadolinia concentration thereof is at 4.5 wt% in the range of 11/24 to 22/24 of the axial entire length of the fuel effective length portion. The gadolinia concentration of the fuel rod G2 is at 0.0 % in the range of 1/24 to 11/24 of the entire axial length of the fuel effective length portion, and the gadolinia concentration thereof is at 3.5 wt% in the range of 11/24 to 22/24 of the entire axial length of the fuel effective length portion. It is unnecessary to fill the natural uranium filling region with gadolinia since the power thereat is inherently small. If the gadolinia would be filled in this region, the gadolinia would be left after the completion of the operational cycle. The upper region is located above the position of 11/24 of the axial entire length of the fuel effective length portion from the lower end of the fuel effective length portion, whereas the lower region is located below that position. In the embodiment, twelve fuel rods G1 and four fuel rods G2 are used. The four fuel rods G2 are arranged at the position adjacent to the water rods WR that form the saturated water region therebetween. The twelve fuel rods G1 are arranged radially inward from the outermost periphery but are not arranged close to the water rods WR or the channel box 15. The channel box 15 is used to define the cooling water flow path within the fuel assembly 10 and to define a water gap (saturated water region) formed between the fuel assembly 10 when the fuel assembly 10 is installed within the reactor core. Namely, the fuel rods G1 are not arranged close to the saturated water region which is formed when the fuel assembly 10 is installed within the reactor core.

Figure 12:
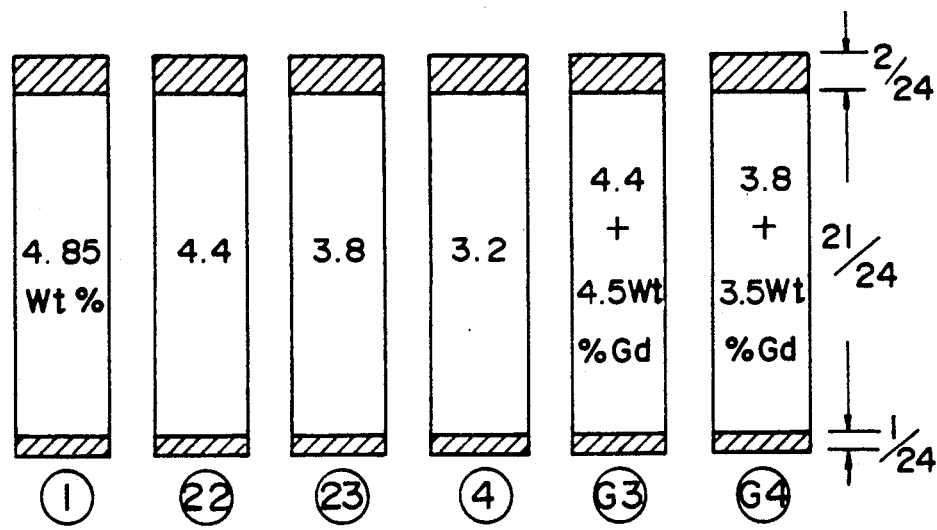
FIG. 12 is a view showing the enrichment and gadolinia concentration distribution of each fuel rod shown in FIG. 11.
Figure 13:
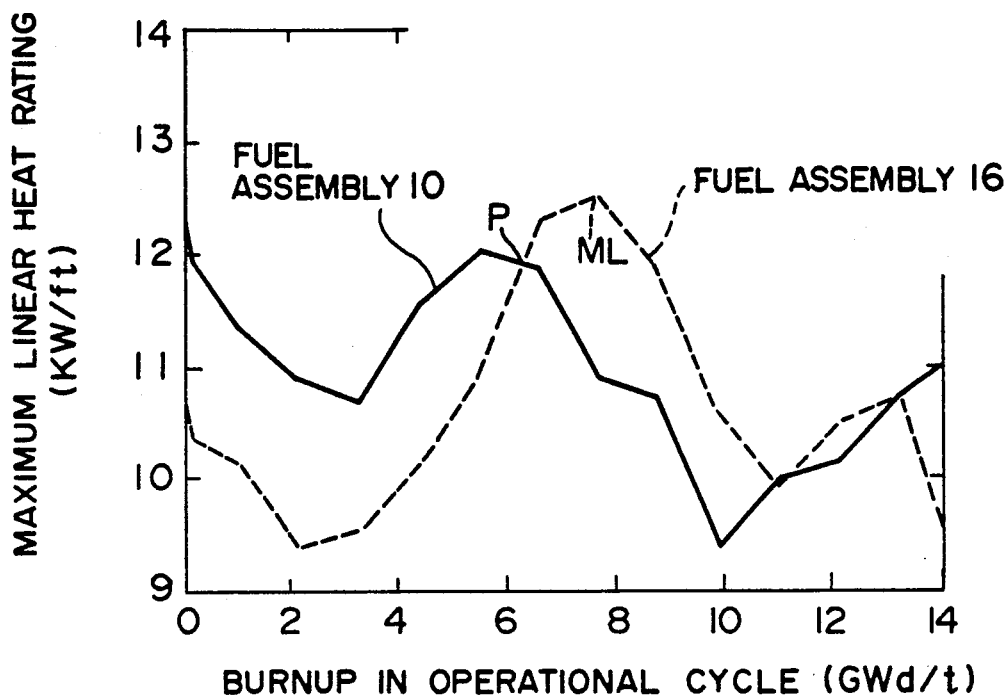
FIG. 13 is a characteristic diagram showing the relationship between the burnup and the maximum lenear heat retaing relative to the fuel assembly shown in FIG. 8.
Figure 14:
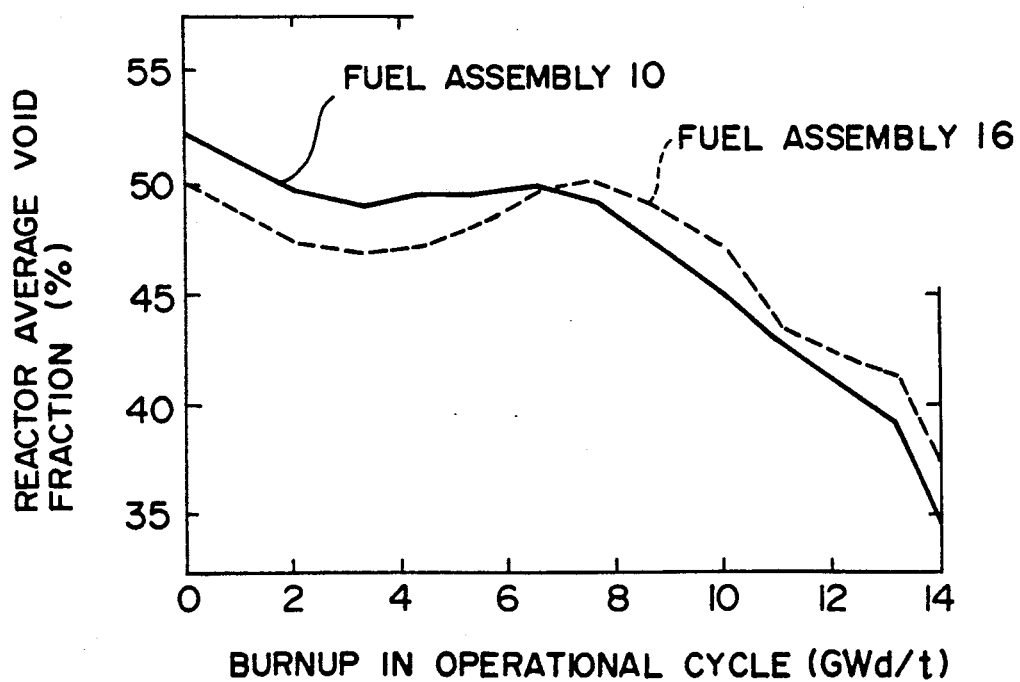
FIG. 14 is a characteristic diagram showing the relationship between the burnup and the reactor core average void fraction relative to the fuel assembly shown in FIG. 8.

With respect to the gadolinia within the fuel assembly 10, the amount of the gadolinia in the upper region of the fuel assembly 10 is expressed by the equation, $4.5 \text{ wt\%} \times 12 + 3.5 \text{ wt\%} \times 4 = 68$, whereas the amount in the lower region of the fuel assembly 10 is smaller and expressed by the equation, $5.0 \text{ wt\%} \times 12 + 0.0 \text{ wt\%} \times 4 = 60$. When the fuel rods G1 and G2 are divided into upper and lower regions, the maximum gadolinia concentration (5 %) portion and the minimum gadolinia concentration (0.0 %) portion are both present in the lower region in the gadolinia containing fuel rods. The above-described maximum and minimum gadolinia concentration portions are not present in the enriched uranium filling region in the upper region of the fuel assembly 10. Further, the fuel rods G2 containing the gadolinia at the minimum concentration are arranged in the vicinity of the water rods WR for enhancing the reactivity moderating effect by the converted nuclear seeds from the gadolinia after the burnup of the gadolinia, thereby keep the reactivity moderation at a minimum level. In the embodiment, to reduce the maximum heat rating, the average enrichment of the lower region of the fuel assembly is lower by 0.2 wt% than that of the upper region. FIG. shows the fuel assembly used for illustrating the effect of the embodiment, which fuel assembly is shown in Japanese Patent Unexamined Publication 62-217186, the gadolinia concentration and the enrichment distribution are kept uniform in both of regions. The fuel rods 1, 22, 23, 4, G3 and G4 shown in FIG. 12 are arranged to form a fuel assembly 16. The enrichments of the fuel rods 1, 22, 23, 4, G3 and G4 are at 4.85, 4.40, 3.80, 3.20, 4.40 and 3.80 wt%, respectively in the regions in the natural uranium filling region between the upper and the lower end portions thereof. The fuel rods G3 and G4 contain gadolinia with gadolinia concentrations of 4.50 and 3.50 wt%, respectively. FIG. 13 shows a change, relative to the burnup, of the maximum linear heat rating of the reactor core to which each of the fuel assemblies 10 and 16 is loaded. FIG. 14 shows a change, relative to the burnup, of the reactor average void fraction. In the fuel assembly 10 according to this embodiment, the amount of gadolinia in the upper region in the axial direction is larger than that in the lower region. Within the gadolinia containing fuel rods, the maximum and minimum gadolinia concentration portions are present only in the lower regions. Therefore, it is possible to keep the power peaking in the lower region at a high level in comparison with the fuel assembly 16 before the middle stage of the operational cycle. It is possible to keep the reactor core average void fraction in the first half of the operational cycle at a constant level that is larger than that of the fuel assembly 16, as shown in FIG. 14 in solid line. Thus, the spectral shift effect in the fuel assembly 10 is increased. The neutron effective multiplication factor at the final stage of the cycle according to this embodiment is higher than that of the fuel assembly 16 by 0.3% Δk. This shows the effect of 1% reduction of the necessary natural uranium amount. In the fuel assembly 10, it is possible to make the maximum linear heat rating smaller than the maximum linear heat rating ML that is at maximum in the fuel assembly 16.

The case will be explained where the concept is applied to the fuel assembly 16, in which the fuel rods G2 with the gadolinia concentration of 4.5 wt% in the lower region and the gadolinia concentration of 3.5 wt% in the upper region and the fuel rods G3 with the gadolinia concentration of 0.0 % in the lower region and the gadolinia concentration of 4.5 wt% in the upper region are used as shown in FIG. 3B of U.S. Pat. No. 4,587,090. Namely, assume that, in the fuel assembly 16, the distribution of the gadolinia concentration of the fuel rods G3 is changed as the fuel rod G3 of U.S. Pat. No. 4,587,090, and the distribution of the gadolinia concentration of the fuel rod G4 is changed as the fuel rod G3 of U.S. Pat. No. 4,587,090. On the basis of this as the assumption, if the operation is started with the thus assumed fuel assembly being loaded on the reactor core, the maximum linear heat rating and the average void fraction are changed as follows. Namely, the maximum linear heat rating is changed between the solid line and the dotted line until reaching the position of about 6GWd/t (the intersection P between the solid line and the dotted line) in FIG. 13 and is changed along the dotted line after the point P. The reactor average void fraction of the assumed fuel assembly is changed in the same manner as the maximum linear heat rating. The reason why such characteristics are obtained in the assumed fuel assembly is that the maximum gadolinia concentration (4.5 wt%) within the gadolinia containing fuel rods is present in the lower region of the fuel rod G2 and the upper region of the fuel rod G3.

In the fuel assembly 10 according to the embodiment, the maximum gadolinia concentration portion Gmax (for example, 5.0 wt%) within the gadolinia containing fuel rod is present in the lower portion of the fuel rod G1 (more exactly in the enriched uranium filling region within the lower region), the minimum gadolinia concentration Gmin portion (for example, 0.0 %) within the gadolinia containing fuel rod is present in the lower region of the fuel rod G2 (more exactly in the enriched uranium filling region of the lower region) and none of the maximum gadolinia concentration Gmax portion and the minimum gadolinia concentration Gmin portion within the gadolinia containing fuel rods are present in the upper region of the fuel rods G1 and G2 (more exactly in the enriched uranium filling region within the upper region).

Accordingly, it is possible for the fuel assembly 10 to lower the maximum linear heat rating having the largest value exceeding that of the above-described fuel assembly assumed on the basis on FIG. 3B of U.S. Pat. No. 4,587,090. Also, since it is also possible for the fuel assembly 10 to keep the power peaking in the lower region of the first half of the operational cycle and the reactor void fraction at high levels than those of the assumed fuel assembly, the spectral shift effect is more enhanced than that of the assumed fuel assembly. Incidentally, the gadolinia concentration of the upper region (in particular in the enriched uranium filling region in the upper region) of each gadolinia containing fuel rod (G1 and G2) in the embodiment is between the maximum gadolinia concentration Gmax and the minimum gadolinia concentration Gmin.

Since the fuel rods G1 having the maximum gadolinia concentration Gmax in the lower region thereof are disposed in the radial inner region from the outer periphery of the fuel assembly and away from the saturated water region, in which the neutron spectrum is hard, it is possible to effect the function of the gadolinia within the fuel rods G1 until the final stage of the operational cycle. The gadolinia in the upper and the lower regions of the fuel rods G1 is consumed in the final stage of the operational cycle. In the case where, as in the embodiment, the fuel rods G2 having the gadolinia concentration lower than that of the fuel rods G1 and having the gadolinia concentration in the upper region rather higher than in the lower region are disposed adjacent to the water rods WR, it is possible to enhance the shutdown margin of the reactor and effect the spectral shift at a maximum level. The fuel rods G2 have the function to increase the gadolinia amount in the upper region of the fuel assembly higher than that of the lower region. The function to generate the spectral shift is imparted to the fuel assembly 10.

The natural uranium region located in the upper and the lower ends of each fuel rod has an effect to reduce the amount of neutron leaked downwardly and outwardly of the reactor core to enhance the economical aspect.

In the embodiment, the fuel rods 13 are arranged in triplex closed loops from the outermost periphery of the fuel assembly to surround the two water rods WR. The two water rods WR are arranged in the central portion of the transverse cross-section of the fuel assembly and occupy an area corresponding to the area of the fuel rods 13 in a matrix of 3 rows and 3 columns. A diameter of the water rod WR is selected so that the water rods may be arranged in the above-described area. Thus, although the two water rods WR are disposed in such area, two fuel rods 13 may be further disposed besides the two water rods WR in the direction perpendicular to the straight line connecting the centers of the two water rods WR in the area where the fuel rods of 3 rows and 3 columns may be disposed. Therefore, the number of the replaced fuel rods 13 is reduced to seven (7=9−2). Also, since the two water rods WR are disposed in the central portion of the fuel assembly, it is possible to well moderate the fission neutron generated in the central portion of the fuel assembly 10 to enlarge the thermal neutron flux. Therefore, the thermal neutron flux in the central portion of the fuel assembly is enhanced and the thermal neutron flux distribution is flatted in the fuel assembly 10. Also, the fuel rods 13 and the water rods WR within the fuel assembly 10 are not considerably displaced from the symmetric arrangement thereof with respect to the center of the fuel assembly 10, so that it is possible to arrange the fuel rods having the same enrichment in a substantial symmetric arrangement.

Figure 15:
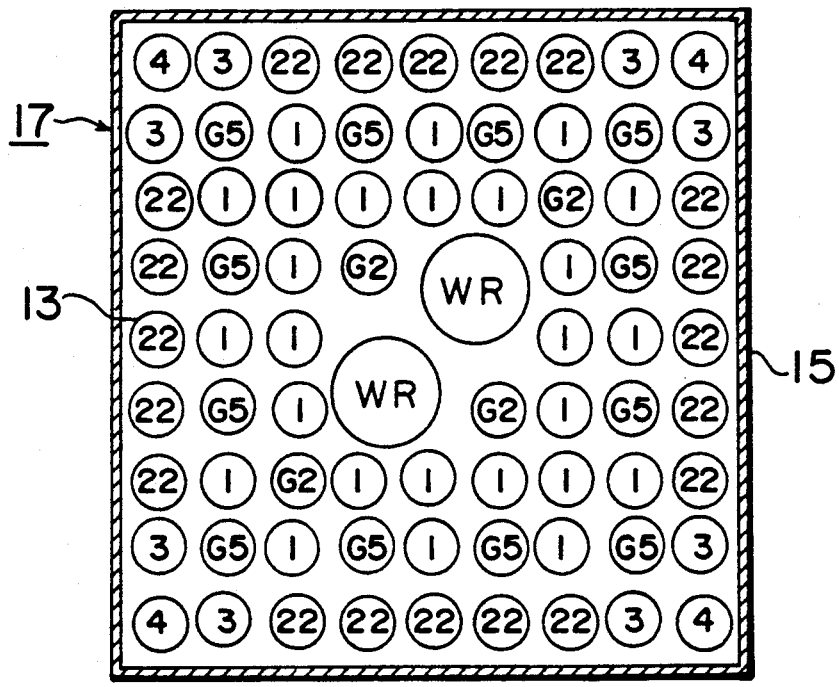
FIGS. 15, 17, 19 and 21 are cross-sectional views showing fuel assemblies in accordance with other embodiments of the invention.
Figure 16:
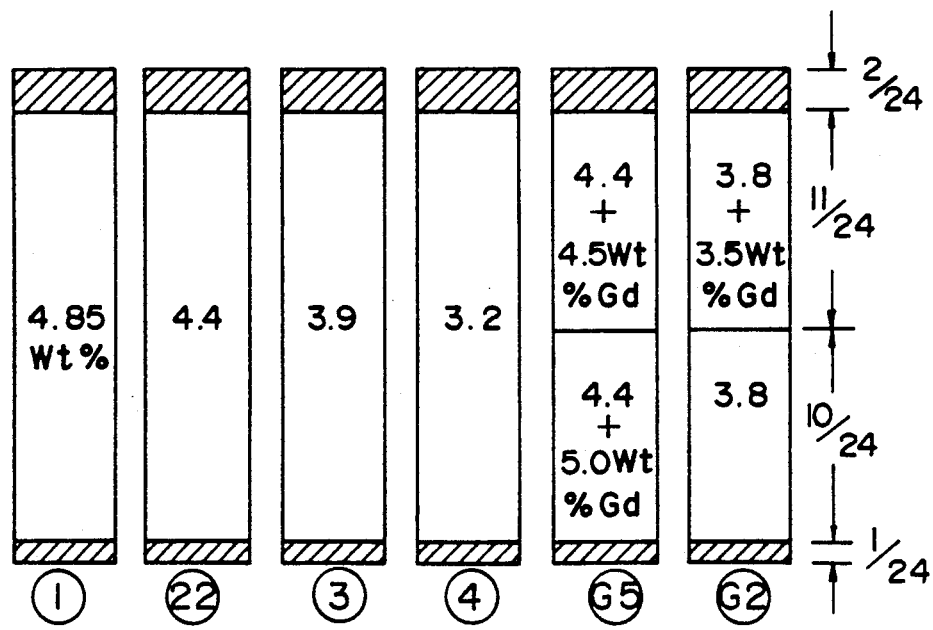
FIGS. 16, 18, 20 and 22 are characteristic diagrams showing the enrichment and the gadolinia concentration distribution of each fuel rod shown in FIGS. 15, 17, 19 and 21, respectively.

Another embodiment will be explained with reference to FIGS. 15 and 16, which is applied to the boiling water reactor. The fuel assembly 17 is substantially identical to the fuel assembly 10 with respect to the arrangement thereof. The differences therebetween reside in that the fuel rods 2 of the fuel assembly 10 are replaced by fuel rods 22 in which the enrichment of the enriched uranium filling region is uniform in the axial direction at 4.40 wt%, and the fuel rods G1 are replaced by fuel rods G5 that have a higher enrichment of 4.40 wt%. The other structure of the fuel assembly 17 is the same as the fuel assembly 10.

The fuel assembly 17 has the same effect as that of the fuel assembly 10. Since the fuel assembly 17 uses the fuel rods 22, the maximum linear heat rating is increased by 2% in comparison with the fuel assembly 10. Also, the spectral shift effect is increased to enhance the effective multiplication in the final stage of the operational cycle by 0.05% $\Delta k$.

Also, the shutdown margin of the reactor is enhanced according to the fuel assembly 17 rather than the fuel assembly 10. The reason for this is that since the enrichment of the upper region of the fuel assembly 17 is lower than that of the fuel assembly 10, the reactivity increment during the cold stop state becomes small. It should be noted that, according to this embodiment, the shutdown margin of the reactor is enhanced over the case where the enrichment and the gadolinia distribution are kept uniform in the axial direction in the fuel assembly 10. Under the condition that the enrichment distribution is kept constant in the axial direction and the gadolinia distribution in the upper region is kept constant, if the amount of the gadolinia in the lower region is decreased, the reactivity of the lower region is enhanced, so that the shutdown margin of the reactor is ensured.

Figure 17:
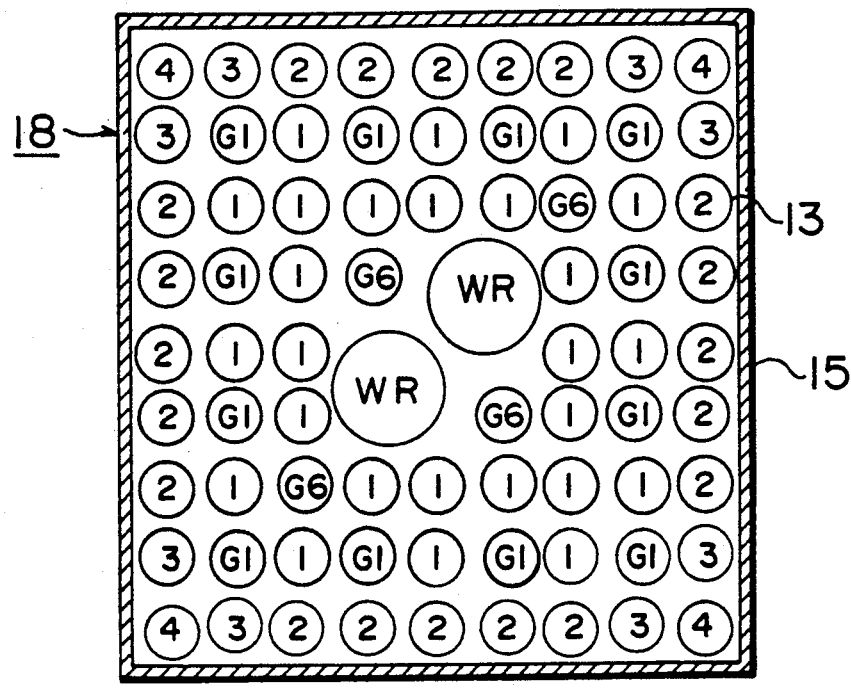
Figure 18:
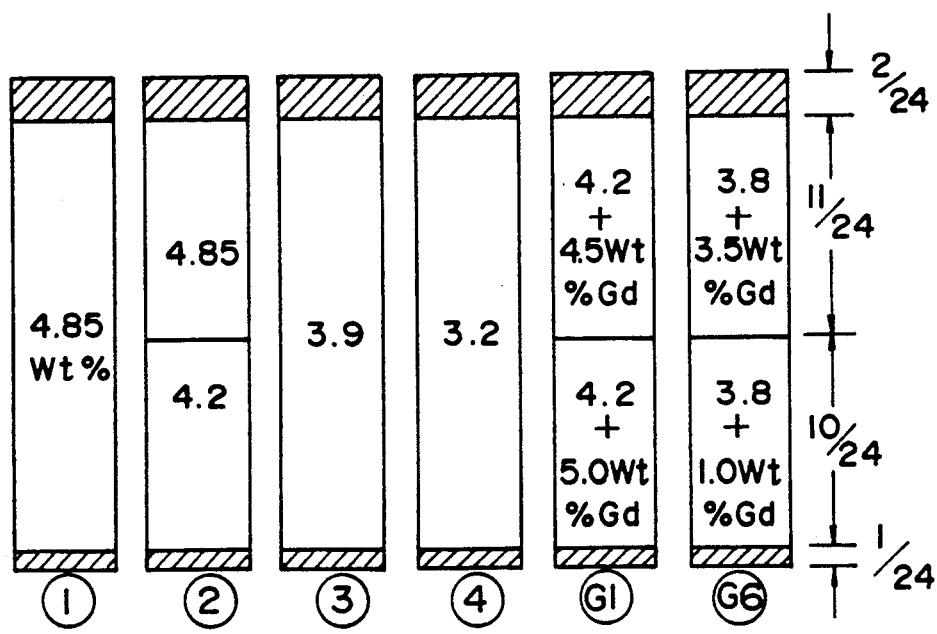

Still another embodiment of the invention will now be described hereinunder with reference to FIGS. 17 and 18. In this fuel assembly 18, the minimum gadolinia concentration Gmin is changed from 0.0 % to 1.0 wt%. Namely, in the fuel assembly 18, the fuel rods G6 are used instead of the fuel rods G2, the gadolinia concentration of the lower region of which is kept at 1.0 wt%. The four fuel rods G6 are arranged in the vicinity of the water rods WR in the same manner as the fuel assembly 10, that is, are confronted with the saturated water region. Thus, the thermal neutron flux density is kept at a high level. Therefore, it is possible to ensure the relatively large reactivity moderating effect even with a small amount of gadolinia. Also, the gadolinia concentration of the upper region of the fuel rods G6 is smaller than the gadolinia concentration of the upper region of the other gadolinia containing, fuel rods (G1) so that the gadolinia is fully burnt and is not left in the final stage of the operational cycle. An object of the arrangement of the plurality of water rods WR is to make uniform the power distribution within the fuel assembly. To this end, the gadolinia within the fuel rods G6 in the vicinity of the water rods WR is adapted to be burnt up fully when almost gadolinia is burnt up to increase the power. As a result, it is possible to increase the reactivity moderating effect at the initial stage of the operational cycle without sacrificing the effect on the power distribution uniformity. In this embodiment, the gadolinia amount in the upper region of the fuel assembly 18 is expressed by the equation, 4.5 wt%×12+3.5 wt%×4=68 and the gadolinia amount in the lower region thereof is expressed by the equation, 5.0 wt%×12+1.0 wt%×4=64. The gadolinia amount in the lower portion is smaller than that in the upper portion.

Figure 11:
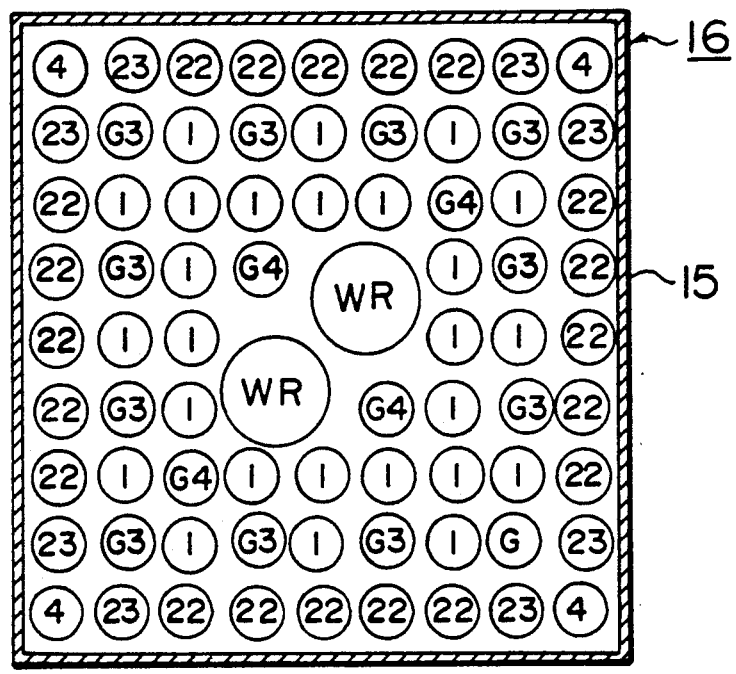
FIG. 11 is a cross-sectional view showing an assumed fuel assembly for illustrating the effect of the fuel assembly shown in FIG. 8.

The fuel assembly 18 has the same effect as the fuel assembly 10. In particular, it is possible for the fuel assembly 18 to moderate the axial power peaking in the initial stage of the operational cycle by means of the fuel rods G6 in comparison with the fuel assembly 10. The linear heat rating of the fuel assembly 18 is then lowered. As a result, the maximum linear heat rating is lower by 3% than the fuel assembly 10 throughout the operational cycle. On the other hand the spectral shift effect is weakened since the gadolinia of the lower region of the fuel assembly 18 is somewhat increased, and the power distribution is made uniform as a whole. Therefore, the effective multiplication in the final stage of the operational cycle is lowered by about 0.1% $\Delta k$. However, on the basis of the fuel assembly 16 in which the enrichment is kept constant in the axial direction as shown in FIG. 11, although the maximum linear heat rating is lowered by 3%, the effective multiplication at the final stage of the operational cycle is increased by 0.2% k.

Figure 19:
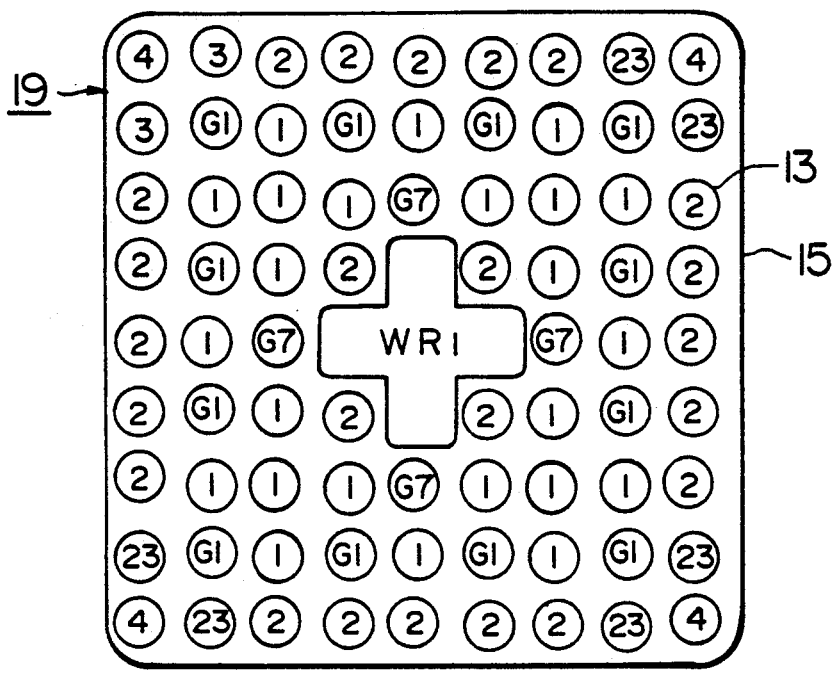
Figure 20:
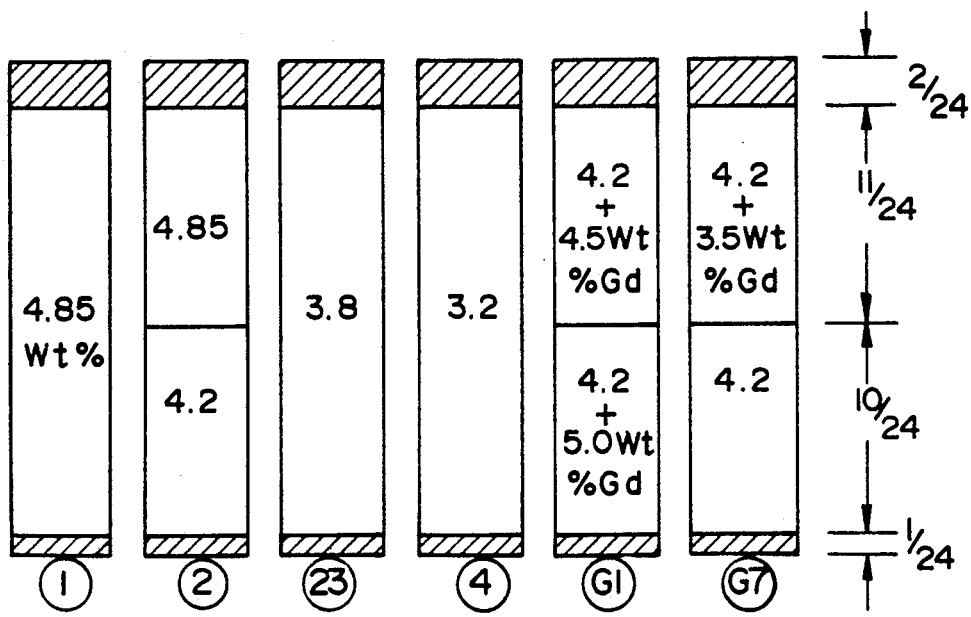

Still another embodiment of the invention will now be described with reference to FIGS. 19 and 20. In this fuel assembly 19, a water rod WR1 having a cruciform cross section is arranged in the central portion of the fuel assembly 19. The fuel rods 1, 2, 23, 4, G1 and G7 are arranged in the fuel assembly 19 so as to surround the water rod WR1. The water rod WR1 sufficiently occupy a space corresponding to the space of the five fuel rods to keep the same water area as the fuel assembly 18. The number of the gadolinia containing fuel rods of G1 and G7 is sixteen. The twelve fuel rods G1 contains 4.5 wt% gadolinia in the upper region and 5.0 wt% gadolinia in the lower region. The other four fuel rods G7 are disposed close to the water rod WR1 and contain only in the upper region thereof the gadolinia of 3.5 wt%. The maximum gadolinia concentration 5.0 wt% portion and the minimum gadolinia concentration 0.0 % portion are present in the lower region of the fuel assembly 19 but not present in the upper region of the fuel assembly 19. Also, the gadolinia amount is smaller in the lower region of the fuel assembly 19. The enrichment of the lower region is lower than the upper region. However, the average of the enrichment difference between the upper and lower regions is at 0.2 wt% and is the same as the fuel assembly 10. The fuel assembly 19 has the same effect as the fuel assembly 10. However, in this embodiment, since the number of the fuel rods is larger by two than that of the fuel assembly 10, the average linear heat rating is lowered by about 2%. For that reason, it is possible to suppress the maximum linear heat rating relative to the fuel assembly 10.

The characteristics of the reactor core on which the fuel assembly 19 is loaded are substantially the same as those of the fuel assembly 10. The improved effect of the characteristics relative to the uniform axial distribution and the enrichment in the fuel assembly 19 is also substantially the same as those of the fuel assembly 10.

In the case where a large amount of recycle fuel may be used in a commercial light water reactor, it is possible to obtain the same effect with the plutonium instead of the uranium fuel.

Figure 21:
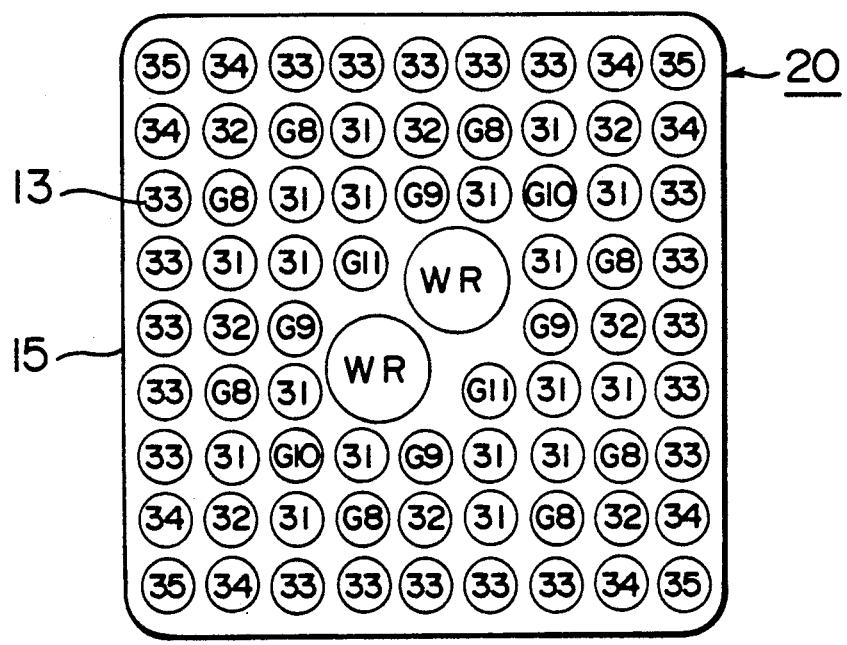
Figure 22:
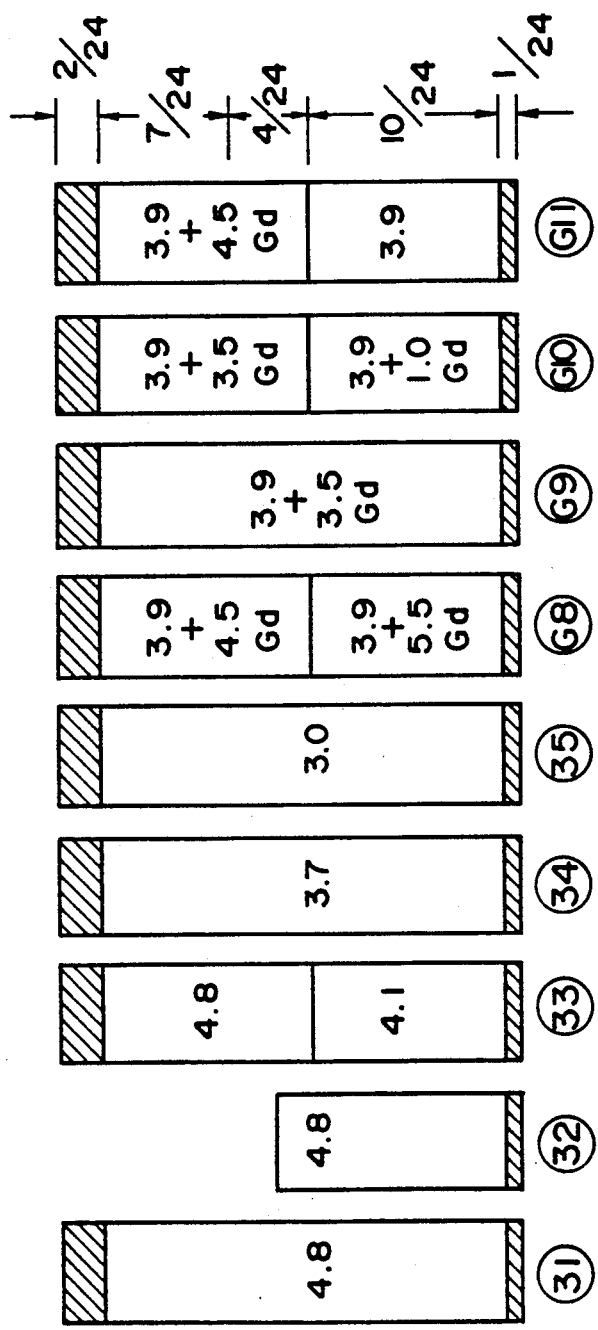

Further another embodiment of the invention will be described hereinunder with reference to FIGS. 21 and 22. This fuel assembly 20 is constituted by replacing all of fuel rods in the fuel assembly 10 with new set of fuel rods 31 to 35, and G8 to G11 shown in FIG. 22. These nine kinds of fuel rods are arranged in the fuel assembly as shown in FIG. 21. Each fuel rods is filled with natural uranium in a range between a lower end of the effective length portion and 1/24 of an entire effective length thereof. Further, in the fuel rods except for the fuel rods 32, natural uranium is further filled in a range between 22/24 of the entire effective length of the effective length portion and an upper end thereof. These upper and lower ends of the fuel rods 31, 34, 35, and G8 to G11 are the enriched uranium filling regions. The enrichments in the enriched uranium filling regions in the fuel rods 31, 34, 35 and G8 to G11 are 4.8 wt%, 3.7 wt%, 3.0 wt%, 3.7 wt% 3.9 wt%, 3.9 wt% and 3.9 wt%, respectively. The enrichment in each of the fuel rods is uniform in an axial direction thereof. The enriched uranium filling region in the fuel rod 33 is divided into an upper region and a lower region at a separating point of 11/24 of the axial entire length of the fuel effective length portion from the lower end thereof. The enrichment in the upper region of the enriched uranium filling region is 4.8 wt% and that in the lower region thereof is 4.1 wt%.

The fuel rods G8 to G11 contain gadolinia in the enriched uranium filling regions. The fuel rod G9 contains gadolinia of 3.5 wt% allower the enriched uranium filling region thereof. The enriched uranium filling region of each of the fuel rods G8, G10 and G11 is divided into an upper region and a lower region at the same separating point as the fuel rod 33. The fuel rod G8 contains gadolinia of 4.5 wt% in the upper region thereof and gadolinia of 5.5 wt% in the lower region thereof. The fuel rod G10 contains gadolinia of 3.5 wt% in the upper region thereof and gadolinia of 1.0 wt% in the lower region thereof. The fuel rod G11 contains gadolinia of 4.5 wt% in the upper region thereof and no gadolinia in the lower region thereof. The fuel rod 32 has an upper end of the effective length portion which is located in 15/24 of the axial entire length of the fuel effective length portion from the lower end of another fuel rod. The fuel rod 32 has an axial length which is smaller than that of the other fuel rods. All of fuel rods 32 are located in an inner closed loop adjacent the outermost periphery of the fuel assembly 20. The use of the short length fuel rods are disclosed in Japanese Unexamined Publication Nos. 52-50498 and 60-2240092.

This embodiment has the same effect as that of the fuel assembly 10, because a region of upper and lower regions in the fuel rods containing a maximum gadolinia concentration and a region of upper and lower regions in the fuel rods containing a minimum gadolinia concentration are located in the lower region in the fuel assembly, and the amount of gadolinia in the upper region in the fuel assembly is larger that in the lower region in the fuel assembly. Further, the short length fuel rod can lower the pressure loss in the upper region in the fuel assembly and improve the shutdown margin of the reactor.

What is claimed is:

1. A fuel assembly comprising a plurality of first fuel rods each of which contains nuclear fuel material but does not contain burnable poison and a plurality of second fuel rods each of which contains nuclear fuel material and burnable poison, characterized in that an amount of the burnable poison in a lower region of said fuel assembly is smaller than that in an upper region of said fuel assembly, and that when each of said second fuel rods is divided into an upper region and a lower region, a region of said divided regions in said second fuel rods containing a maximum burnable poison concentration Gmax and a region of said divided regions in said second fuel rods containing a minimum burnable poison concentration Gmin are located in the lower region of said fuel assembly, the maximum burnable poison concentration Gmax being located only in the lower region of said fuel assembly.

2. The fuel assembly according to claim 1, wherein said minimum burnable poison concentration Gmin is zero.

3. The fuel assembly according to claim 1, wherein said minimum burnable poison concentration Gmin is greater than zero.

4. The fuel assembly according to claim 1, wherein an average enrichment in the lower region of said fuel assembly is smaller than that of the upper region thereof.

5. The fuel assembly according to claim 1, wherein the burnable poison concentration G of the upper region of each of said second fuel rods meet a relationship, $Gmin < G < Gmax$.

6. The fuel assembly according to claim 1, wherein said fuel assembly further comprising a third fuel rod having an axial length of fuel effective length portion smaller than that of said first fuel rod and smaller than that of said second fuel rod.

7. The fuel assembly according to claim 6, wherein said third fuel rod is a part of said first fuel rod.

8. A fuel assembly comprising a plurality of fuel rods each of which contains nuclear fuel material but does not contain burnable poison, a plurality of fuel rods each of which contains the nuclear fuel material and the burnable poison, and at least one water rod disposed between said fuel rods, characterized in that an amount of said burnable poison in a lower region of said fuel assembly is smaller than that in an upper region thereof, and said plurality of fuel rods containing the nuclear fuel material and the burnable poison include first fuel rods and second fuel rods whose average burnable poison concentration is lower than that of said first fuel rods, and said second fuel rods are arranged close to said water rod, and than when each of said first and said second fuel rods is divided into upper and lower regions, a region of said divided regions containing a maximum burnable poison concentration Gmax and a region of said divided regions containing a minimum burnable poison concentration Gmin are located in the lower region of said fuel assembly, the maximum burnable poison concentration Gmax being located only in the lower region of said fuel assembly.

9. The fuel assembly according to claim 8, wherein the burnable poison concentration of the lower region of said first fuel rods is said maximum burnable poison. concentration Gmax, and the burnable poison concentration of the lower region of said second fuel rods is said minimum poison concentration Gmin.

10. The fuel assembly according to claim 8, wherein said first fuel rods are disposed in a fuel rod arrangement region except for an outermost peripheral fuel rod arrangement region of the fuel assembly and for a fuel rod arrangement region adjacent to said water rod.

11. The fuel assembly according to claim 8, wherein the burnable poison concentration G in the upper regions of said first and said second fuel rods meets a relationship, $Gmin < G < Gmax$.

12. The fuel assembly according to claim 8, wherein the burnable poison concentration in the lower region of the first fuel rods is higher than that in the upper region thereof, and the burnable poison concentration in the lower region of the second fuel rods is lower than that in the upper region thereof.

13. The fuel assembly according to claim 8, wherein said fuel assembly further comprising a third fuel rod having an axial length of fuel effective length portion smaller than that of said first fuel rod and smaller than that of said second fuel rod.

14. The fuel assembly according to claim 1, wherein both the maximum burnable poison concentration Gmax and the minimum burnable poison concentration Gmin are located only in the lower region of said fuel assembly.

15. The fuel assembly according to claim 1, wherein the upper region and the lower region of said divided regions of said second fuel rods contain enriched uranium, and the regions containing at least one of the maximum burnable poison concentration Gmax and the minimum burnable poison concentration Gmin are located in the lower region which is filled with the enriched uranium.

16. The fuel assembly according to claim 8, wherein both the maximum burnable poison concentration Gmax and the minimum burnable poison concentration Gmin are located only in the lower region of said fuel assembly.

17. The fuel assembly according to claim 8, wherein the upper region and the lower region of said divided regions of said second fuel rods contain enriched uranium, and the regions containing at least one of the maximum burnable poison concentration Gmax and the minimum burnable poison concentration Gmin are located in the lower region which is filled with the enriched uranium.

* * * * *